(12) United States Patent
Albonetti et al.

(10) Patent No.: US 10,899,043 B2
(45) Date of Patent: Jan. 26, 2021

(54) METHOD AND APPARATUS FOR APPLYING ANNULAR DOSES

(71) Applicant: SACMI COOPERATIVA MECCANICI IMOLA SOCIETA' COOPERATIVA, Imola (IT)

(72) Inventors: Danilo Albonetti, Imola (IT); Andrea Sallioni, Molinella (IT)

(73) Assignee: SACMI Cooperativa Meccanici Imola Societa' Cooperativa

( * ) Notice: Subject to any disclaimer, the term of this patent is extended or adjusted under 35 U.S.C. 154(b) by 0 days.

(21) Appl. No.: 16/727,111

(22) Filed: Dec. 26, 2019

(65) Prior Publication Data

US 2020/0171710 A1 Jun. 4, 2020

Related U.S. Application Data

(62) Division of application No. 15/314,355, filed as application No. PCT/IB2015/053582 on May 15, 2015, now Pat. No. 10,603,820.

(30) Foreign Application Priority Data

May 29, 2014 (IT) .............................. MO2014A0157

(51) Int. Cl.
*B29C 31/00* (2006.01)
*B29C 31/04* (2006.01)
(Continued)

(52) U.S. Cl.
CPC .......... *B29C 31/048* (2013.01); *B29C 31/047* (2013.01); *B29C 43/18* (2013.01); *B29C 43/34* (2013.01); *B29C 48/0022* (2019.02); *B29C 48/09* (2019.02); *B29C 48/32* (2019.02); *B29C 48/355* (2019.02); *B29C 48/37* (2019.02); *B29C 48/92* (2019.02); *B29C 2793/009* (2013.01);
(Continued)

(58) Field of Classification Search
CPC .............................. B29C 31/048; B29C 31/06
See application file for complete search history.

(56) References Cited

U.S. PATENT DOCUMENTS

| | | |
|---|---|---|
| 4,492,548 A | 1/1985 | Hubert |
| 2005/0079240 A1 | 4/2005 | Albonetti et al. |

(Continued)

FOREIGN PATENT DOCUMENTS

| | | | |
|---|---|---|---|
| EP | 1527864 A1 * | 5/2005 | ............. B29C 43/18 |
| JP | H0233591 B2 | 7/1990 | |

(Continued)

*Primary Examiner* — Timothy Kennedy
(74) *Attorney, Agent, or Firm* — Laubscher & Laubscher, P.C.

(57) ABSTRACT

A method and an apparatus for forming annular doses provides a flow of plasticised material supplied by an extruder which passes through a channel that is first cylindrical and then annular. The material exits from an annular outlet in front of which a cutting element passes that separates an annular dose of material. The dose is deposited on a surface of a capsule having a capacity to adhere to the dose that is greater than the cutting element. The surface and the cutting element are distanced from one another in such a manner that the annular dose remaining adhering to the capsule is detached from the element. Detachment can be promoted by a flow of air.

11 Claims, 7 Drawing Sheets

(51) Int. Cl.
    *B29C 48/00*     (2019.01)
    *B29C 48/32*     (2019.01)
    *B29C 48/92*     (2019.01)
    *B29C 43/18*     (2006.01)
    *B29C 43/34*     (2006.01)
    *B29C 48/09*     (2019.01)
    *B29C 48/37*     (2019.01)
    *B29C 48/355*    (2019.01)
    *B29L 31/56*     (2006.01)

(52) U.S. Cl.
    CPC ... *B29C 2948/926* (2019.02); *B29L 2031/565* (2013.01)

(56) References Cited

U.S. PATENT DOCUMENTS

2011/0100994 A1   5/2011   Albonetti et al.
2012/0171381 A1   7/2012   Haar

FOREIGN PATENT DOCUMENTS

| JP | H06312762 A | 11/1994 |
| JP | 2001088194 A | 4/2001 |
| JP | 2011528288 A | 11/2011 |
| WO | 9718073 A1 | 5/1997 |
| WO | 2015092644 A1 | 6/2015 |

* cited by examiner

METHOD AND APPARATUS FOR APPLYING ANNULAR DOSES

This application is a division of application Ser. No. 15/314,355 filed Nov. 28, 2016 which was a national phase of PCT International Application No. PCT/IB2015/053582 filed May 15, 2015. PCT/IB2015/053582 claims priority to IT Application No. MO2014A000157 filed May 29, 2014. The entire contents of these applications are incorporated herein by reference.

BACKGROUND OF THE INVENTION

The invention relates to a method and an apparatus for applying annular doses, in particular for forming an annular dose separating the annular dose from a continuous flow of plasticised material by means of an extruder and for applying the annular dose that has just been formed to a surface.

Specifically but not exclusively, the invention can be used for applying a seal to a surface, for example for forming gaskets on objects, for example inside capsules (made of metal or plastics) for closing containers. The invention can be further used to apply an annular dose to a flat element (for example a disc), made in particular of metal or plastics, which can then be inserted, as a seal, into a more complex device. It is possible, in other uses of the invention, to apply the annular dose (as a seal) to a carton element intended, for example, for forming a container or a portion of a container, or directly to a container, for example of plastics or metal.

The annular dose could also be inserted, according to another use of the invention, directly into a mould for obtaining an object therefrom (for example an annular object), in particular with closing functions (for example a cap consisting of a wall made of plastics and of a central metal disc provided with a gasket made from the annular dose) or also with functions other than closing functions.

The prior art comprises patent publication US 2012/0171381 A1 that shows an apparatus for forming an annular dose of plasticised material to be deposited on the surface of a capsule for containers to give rise to the sealing gasket. In this apparatus the dose is expelled and separated by virtue of the high closing speed of a mould that makes the material spurt out.

This known apparatus nevertheless has several limitations and drawbacks.

Firstly, the material that forms the annular dose is pressed out at high pressure, with a possible localised increase of the temperature and consequent deterioration of the material and/or adhesion of the material to the conduit surfaces.

Secondly, to press out the material, low viscosity must be maintained and it is thus necessary to work at relatively high temperatures.

Further, whereas on the one hand using high-viscosity material entails very high operating speeds, on the other hand using low-viscosity materials entails problems of the material running out from the seals.

Another drawback is that the annular dose, spurting out at high speed from the mould, can be deformed in a manner that is not easily controllable.

SUMMARY OF THE INVENTION

One object of the invention is to overcome one or more of the aforesaid limits and drawbacks of the prior art.

One object of the invention is to devise a method for forming an annular dose of plasticised material to be deposited on a surface.

One object of the invention is to provide an apparatus for forming an annular dose of plasticised material to be deposited on a surface.

One advantage is to separate an annular dose from a continuous flow of plasticised material supplied by an extruder.

One advantage is that a plasticised material can exit from an extruder annular outlet, forming the annular dose, at a relatively low pressure.

One advantage is to avoid a localised increase in the temperature of the material in the outlet zone with the consequent deterioration of the material and/or adhesion of the material to the surfaces of the conduit.

One advantage is to permit effective processing even at high viscosity and thus at relatively low temperatures.

One advantage is to permit effective processing of both high viscosity and low viscosity materials.

One advantage is to avoid problems of running of the plasticised material.

One advantage is to form annular doses of the desired shape in a repeatable manner with accuracy.

One advantage is to provide a constructionally simple and cheap apparatus for forming annular doses.

Such objects and advantages, and still others, are achieved by the method and/or by the apparatus according to one or more of the claims set out below.

In one embodiment, a method for forming annular doses comprises the steps of: supplying a flow of plasticised material through an annular channel defined between an internal core and an external annular wall; making the material exit from an annular outlet; passing in front of the annular outlet a cutting element that is movable with respect to the core and to the annular wall to separate an annular dose of material; depositing the annular dose, still in contact with the cutting element, on a surface of an object; removing the object and the cutting element from one another. The detachment of the dose from the cutting element may be promoted by a flow of air.

In one embodiment, an apparatus for forming annular doses comprises an internal core and an external annular wall that cooperate to define an annular channel for supplying plasticised material, said annular channel having a longitudinal axis and an annular outlet, said apparatus comprising an annular cutting element that is movable with respect to said core and to said annular wall in a sliding direction that is parallel to said longitudinal axis to separate an annular dose from plasticised material exiting from said annular outlet.

BRIEF DESCRIPTION OF THE DRAWINGS

The invention can be better understood and implemented with reference to the attached drawings that illustrate some embodiments thereof by way of non-limiting examples.

DETAILED DESCRIPTION

Figure 1:
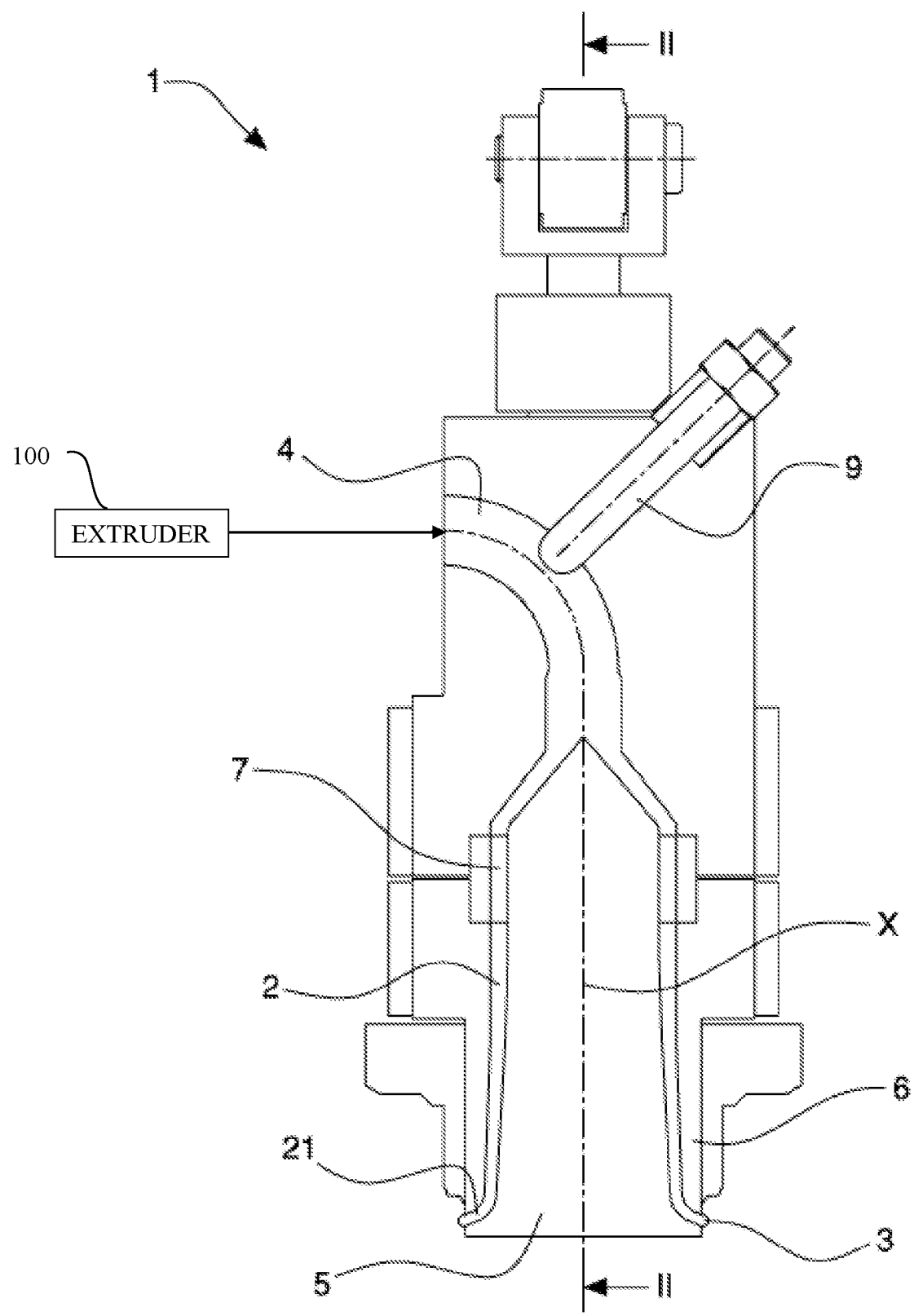
FIG. 1 is a schematic section, in a vertical elevation, of one embodiment of a forming apparatus for forming annular doses in plasticised material, according to the present invention.
Figure 2:
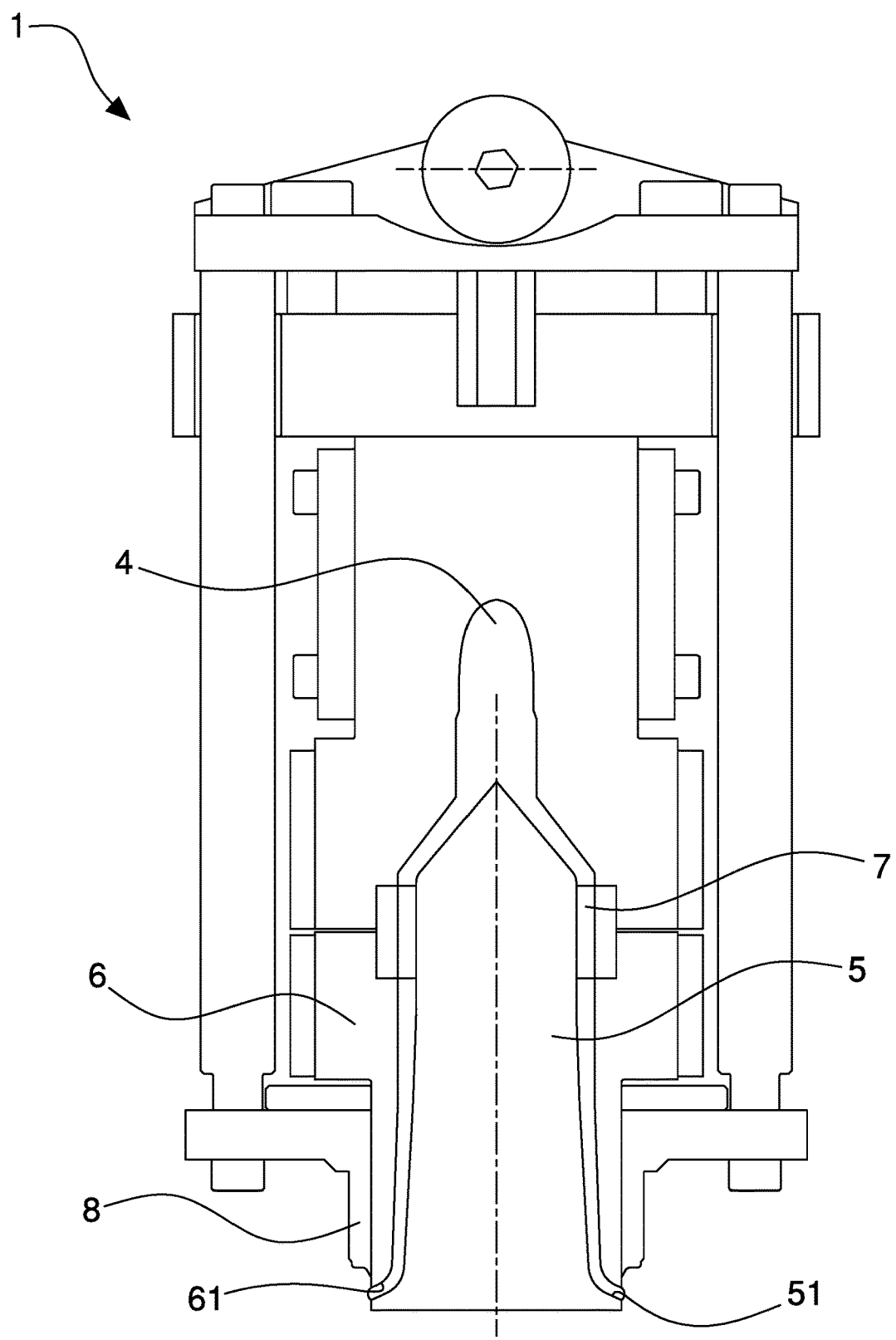
FIG. 2 is a section according to plane II-II of FIG. 1.

With 1, there has been indicated overall an apparatus for forming annular doses D and for applying the annular doses to a surface S of an object.

The apparatus 1 may be used, in particular, for forming annular doses from plasticised material coming from an extruder. The plasticised material may be supplied to the forming apparatus through a determined supply path.

In particular, the forming apparatus 1 may be part of a forming machine (not shown) including a carousel. The carousel may support, for example, a plurality of apparatuses for forming annular doses (in particular apparatuses that are the same as the forming apparatus 1 of the enclosed figures) spaced angularly apart from one another. The carousel may rotate around a vertical rotation axis. The forming machine may include an extruder 100 for supplying plasticised material to the rotating carousel and to the various apparatuses. The extruder may include an extruding screw with a rotation speed of the screw, controlled in a closed or empty loop, by a programmable electronic control device. The extruder may include downstream of the extruding screw a stabilising device for example a volumetric pumping device that, by stabilising the oscillations of the flowrate of the plasticised material, permits a virtually constant flowrate of material.

The forming machine is usable in particular for forming gaskets inside capsules for closing containers. Below, the single forming apparatus is disclosed in greater detail.

The forming apparatus 1 may comprise at least one annular channel 2 for supplying plasticised material. The annular channel 2 may terminate, as in this example, in an annular outlet 3. In the specific case the annular outlet 3 comprises a single closed-loop annular opening, i.e. extending in a complete 360° circumferal direction. It is possible to provide, in other embodiments, for the annular outlet to comprise a plurality of openings arranged in a (closed or open, i.e. complete or partial) loop or a single open-loop annular opening, i.e. extending in a partial circumferal direction that is less than 360°.

The annular channel 2 may communicate, for example in a junction relationship, with a conduit 4 located upstream, for example a conduit 4 supplying the plasticised material with a right cross section that is circular (full), oval (full), or polygonal (full).

The annular channel 2 may have at least one longitudinal axis X (for example a vertical longitudinal axis X). The annular channel 3 may comprise, as in this example, at least one pipe portion of substantially tubular shape and flared with an angle of tilt that is less than 5°, or less than 10°, or less than 15°, or less than 20°, or less than 25°, or less than 30°, with respect to the X axis.

The annular outlet 3 may be shaped in such a manner that the outlet direction of the annular portion of extruded plasticised material has, at every outlet point, at least one normal radial component to the aforesaid longitudinal axis X.

The forming apparatus 1 may comprise at least one core 5 (central or internal) that bounds the annular channel 2 internally.

The forming apparatus 1 may comprise at least one (peripheral or external) annular wall 6 that bounds externally the annular channel 2 and that surrounds at least partially (in a radial direction with respect to the axis X) the internal central core 5.

The annular wall 6 and the core 5 may be integral with one another (as in this example). In particular, the annular wall 6 and the core 5 may be solidly connected together, for example through stiff connecting ribs 7, forming a single integrated body.

The apparatus 1 may comprise, as in this example, a cutting element 8 that is movable (for example axially, in particular in an axial motion direction that is parallel to the aforesaid longitudinal axis X) provided with the possibility of performing a movement (upon command) with respect to the annular wall 6 and to the core 5.

The cutting element 8 may be arranged, for example, around the annular wall 6 so as to surround the annular wall 6 (at least partially). The cutting element 8 may be movable with the possibility of adopting at least one pre-cutting position (FIGS. 3, 4 and 8), in which it enables the plasticised material to exit the annular outlet 3 and in which it has a cutting edge that is ready for cutting. The cutting element 8 may be movable with the possibility of adopting at least one post-cutting position (FIG. 7), in which it has a cutting edge that has already passed in front of the annular outlet 3 and which has already cut the material that has exited from the annular outlet 3 to separate the annular dose D.

The forming apparatus 1 may include a driver (not shown) for moving the cutting element 8 in a reciprocating motion between the pre-cutting and post-cutting positions to perform cutting cycles to form at each cycle at least one annular dose D. The driver may include a cam. The cam may include at least one fixed cam profile that substantially extends in a circumferal arc that is coaxial with the rotation axis of the carousel. The cam may also include at least one cam follower associated with the cutting element and coupled with the aforementioned cam profile. The cam follower may include a roller that is slidable on the cam profile.

The cutting element 8 may have, as said, at least one cutting edge arranged for cutting the plasticised material during the cutting movement in such a manner as to separate the annular dose D, which forms outside the annular outlet 3, from the plasticised material that rests inside the outlet.

The annular wall 6 may have, for example, at least one annular internal surface 61 that is adjacent to (contiguous with) an (upper) edge of the annular outlet 3. The core 5 may have, for example, at least one annular internal surface 51 that is adjacent to (contiguous with) another (lower) edge of the annular outlet 3. The two aforesaid surfaces 61 and 51 (upper annular wall surface and lower core surface) may be spaced apart from one another so as to define an annular chamber 21 (end portion of the annular channel 2 that is contiguous with the annular outlet 3).

The annular chamber 21 may have an axial width (where an "axial width" is defined as the component of width that is measured in a direction parallel to the longitudinal axis X) that increases moving to the inside of the annular outlet 3. This axial width may increase, in particular, in a continuous gradual manner. The annular chamber 21 may have a radial width (where "radial width" is defined as the width component measured in a direction that is normal to the longitudinal axis X) which increases proceeding to the inside of the annular outlet 3. This radial width may increase, in particular, in a continuous gradual manner.

The aforesaid (upper) internal surface 61 of annular wall and the aforesaid (lower) internal surface 51 of core may be two annular surfaces that are tilted with respect to the longitudinal axis X, in particular with tilts that are different from one another. These two tilted surfaces 61 and 51 may be, as in the example disclosed here, two curved surfaces, in particular with different curves from one another.

The axial length of the annular channel 2 may be, in particular, at least five times greater than the width of the annular outlet 3. The axial length of the annular channel 2 may be, more in particular, at least seven times or at least ten times the width of the annular outlet 3. This axial length may in fact be sufficiently extended to enable the plasticised material to form at the outlet an annular dose D in a regular, stable and repeatable manner.

It is possible to provide for the use of a supporting assembly (not shown) for supporting an object, in particular a capsule C for containers, having the surface S on which the annular dose D is deposited. The movable supporting assembly may adopt a receiving position (for example raised as in FIGS. 4 to 7) in which the supported object (capsule C) is near the annular outlet 3 so that the annular dose D that has just been formed is in contact with the surface S of the supported object and can adhere to the surface S. The supporting assembly may be further able to adopt a detachment position for example lowered as in FIGS. 3 and 8 in which the supported object, i.e., capsule C is far from the annular outlet 3 so that the annular dose D that adheres mainly to the surface S of the object is detached from the cutting element 8.

The aforementioned surface S of the object may be activated beforehand (by heating and/or by a layer of primer and/or by another adhesion promoting method or apparatus) to encourage this detachment.

The surface of the cutting element may be provided with anti-adhesion treatment. For example, the cutting element may be previously subjected to an anti-adhesion surface treatment or it may be previously coated with a surface layer of anti-adhesion material.

The supporting assembly (for example an assembly of known type) may be moved by a drive mechanism 104 that guides the motion thereof towards and away from the annular outlet and/or the cutting element 8. Such drive mechanism may include a cam not illustrated. The cam may include at least one fixed cam profile, for example a profile that substantially extends in a circumferential arc that is coaxial with the rotation axis of the carousel. The cam may also include at least one cam follower coupled with the aforesaid cam profile and associated with the supporting assembly that carries the object having the surface on which the dose is deposited. The cam follower may include a roller that is slidable on the cam profile.

The cutting element 8 may be provided as in the illustrated example with a thrust portion, for example shaped as an annular piston, arranged around the cutting edge for pushing downwards the annular dose D to the surface S (below). The vertical movement of the cutting element 8 that carries the thrust portion may be controlled by a driver of known type. In particular, as in this example, the external annular thrust portion is integral with the internal annular cutting edge. The driver of the thrust portion may thus be the same driver of the cutting edge.

The apparatus 1 may include, in one embodiment that is not shown, a blower having at least one annular port for emitting an air jet, in particular arranged around the annular outlet for pushing the annular dose D to the surface S. The blower may include a conduit for delivering gas (air). The conduit may be integrated into the cutting element 8. The conduit may include an annular conduit for emitting an annular jet or a plurality of conduits for emitting several jets. It is possible, in other embodiments that are not illustrated, to provide a jet thrusting device without a piston pushing device or, vice versa, a piston pushing device without a jet thrusting device.

The apparatus 1 may include, or may be operationally associated (for example connected in a processing line) with a compression forming assembly for forming the annular dose D after the latter has been deposited on the surface S. Such a compression forming assembly for example illustrated in the FIGS. 9 and 10 may be arranged, in particular, on a further carousel (not shown) arranged in line downstream of the apparatus that forms and applies the annular doses D. The compression forming assembly may include, for example, a punch of known type. The compression forming assembly may include an actuator for generating the compression moulding force. The actuator may include a cam driver like the cam driver previously disclosed, or a fluid actuator, in particular a linear action actuator.

It is further possible for the apparatus 1 to include a valve 9 to adjust the flow of plasticised material and/or a thermal conditioning device (for example one or more resistances) to heat one or more apparatus parts in contact with the plasticised material.

In use, a continuous flow (at a constant flowrate) of plasticised material is supplied coming from the extruder up to the annular channel 2 and thus to the annular outlet 3. After this, continuing to supply the flow of material continuously, from the annular outlet, an annular portion (of desired volume) of the plasticised material is expelled.

Figure 3:
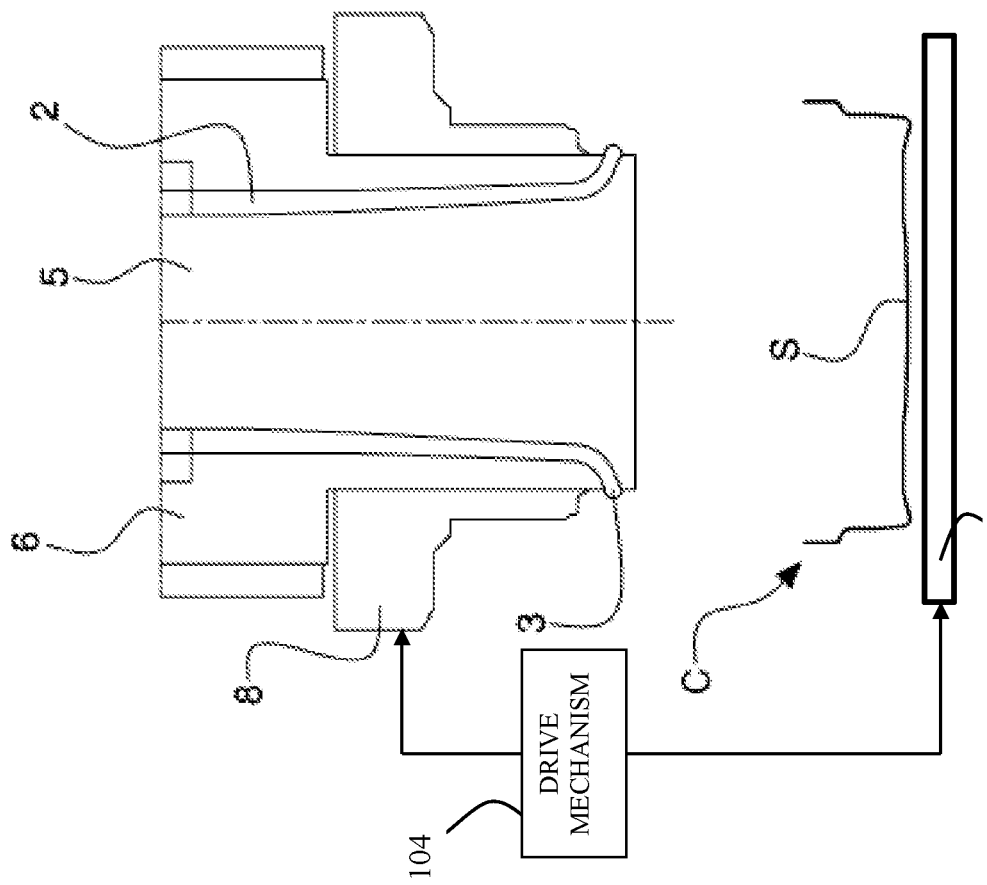

In FIGS. 3 to 8 a single cutting cycle of a dose D is illustrated, starting from the configuration of FIG. 3, in which the cutting element 8 is in the (raised) pre-cutting position and the surface S is far from the annular outlet 3. The material will exit the annular outlet 3 (only) through the effect of the supply pressure of the plasticised material upstream of the annular channel, in particular through the pressure generated by the extruder upstream of the carousel.

Figure 4:
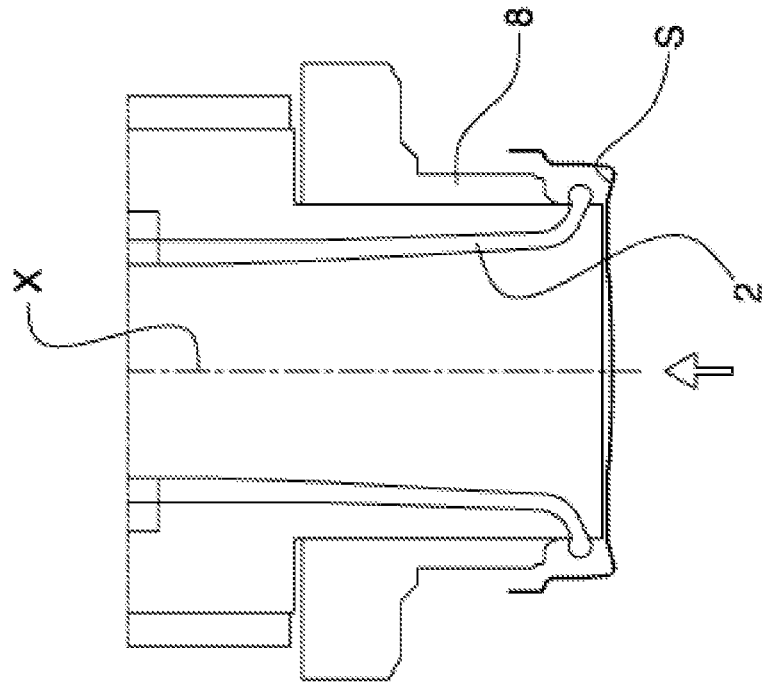
FIGS. 3 to 8 show six steps in sequence of a method of forming an annular dose that is implementable by the apparatus of FIG. 1.
Figure 6:
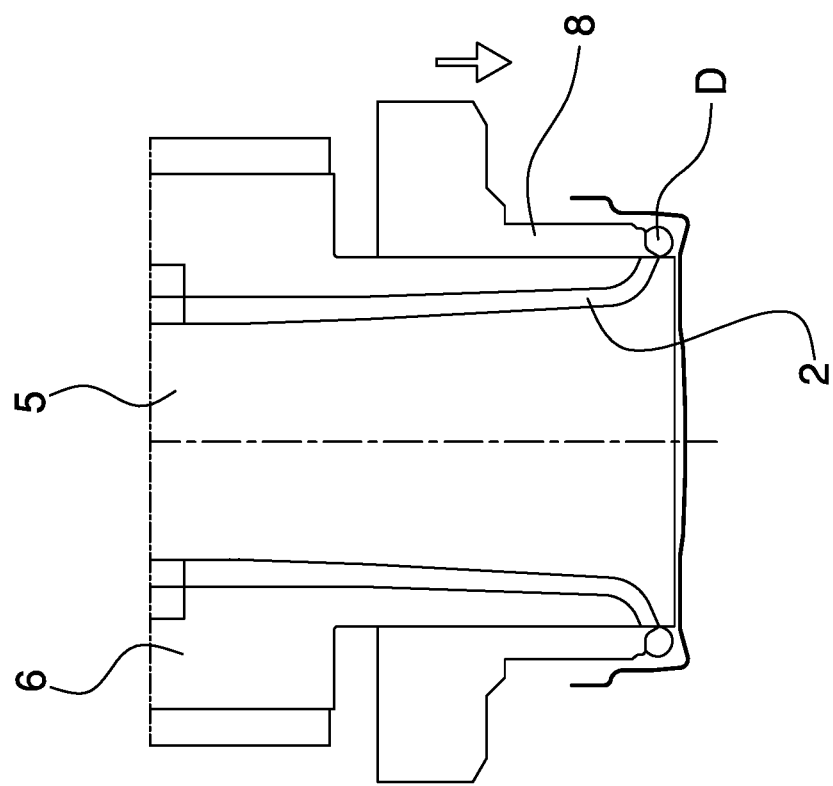
Figure 5:
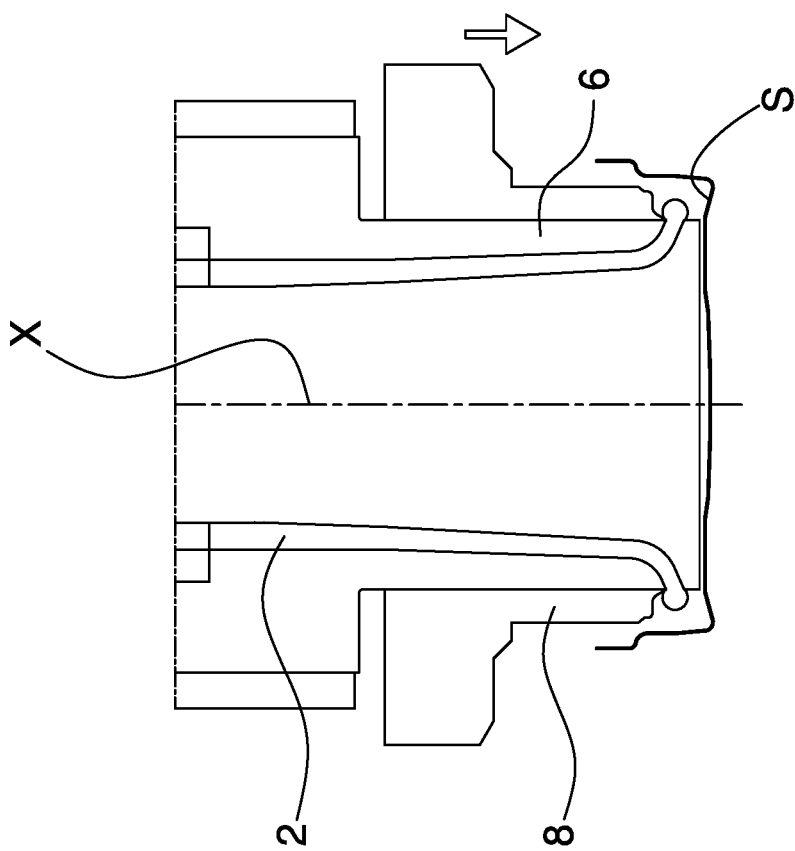
Figure 8:
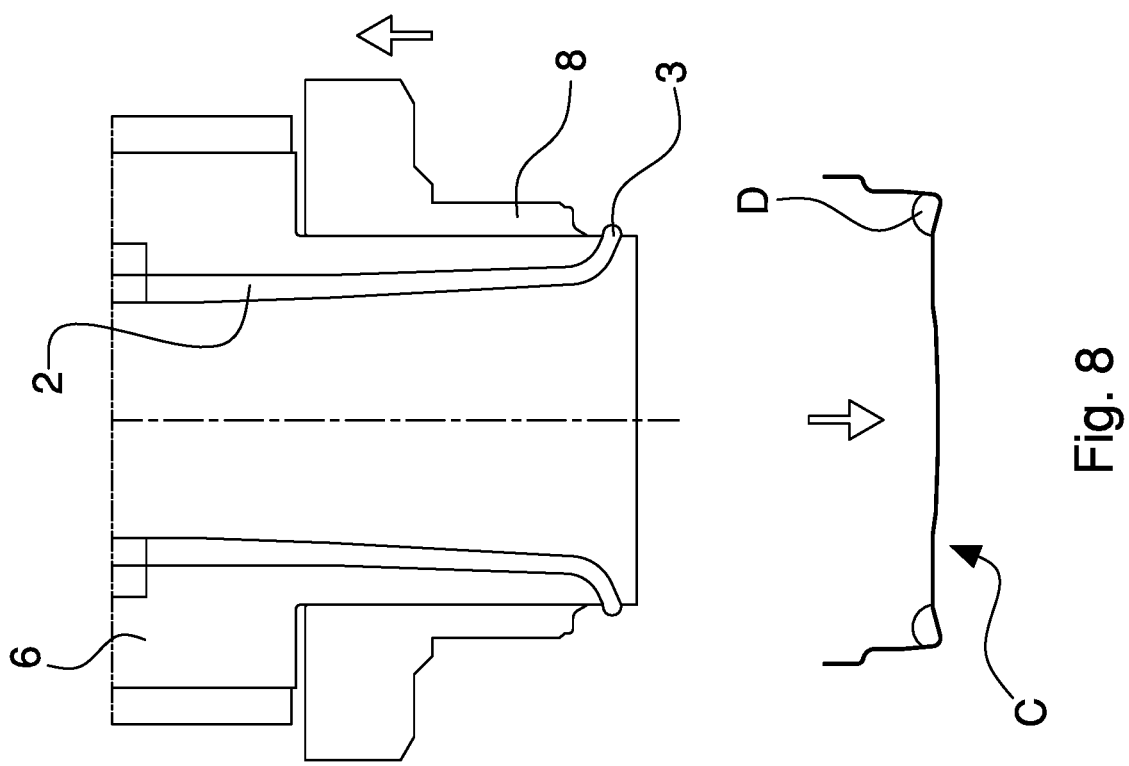
Figure 7:
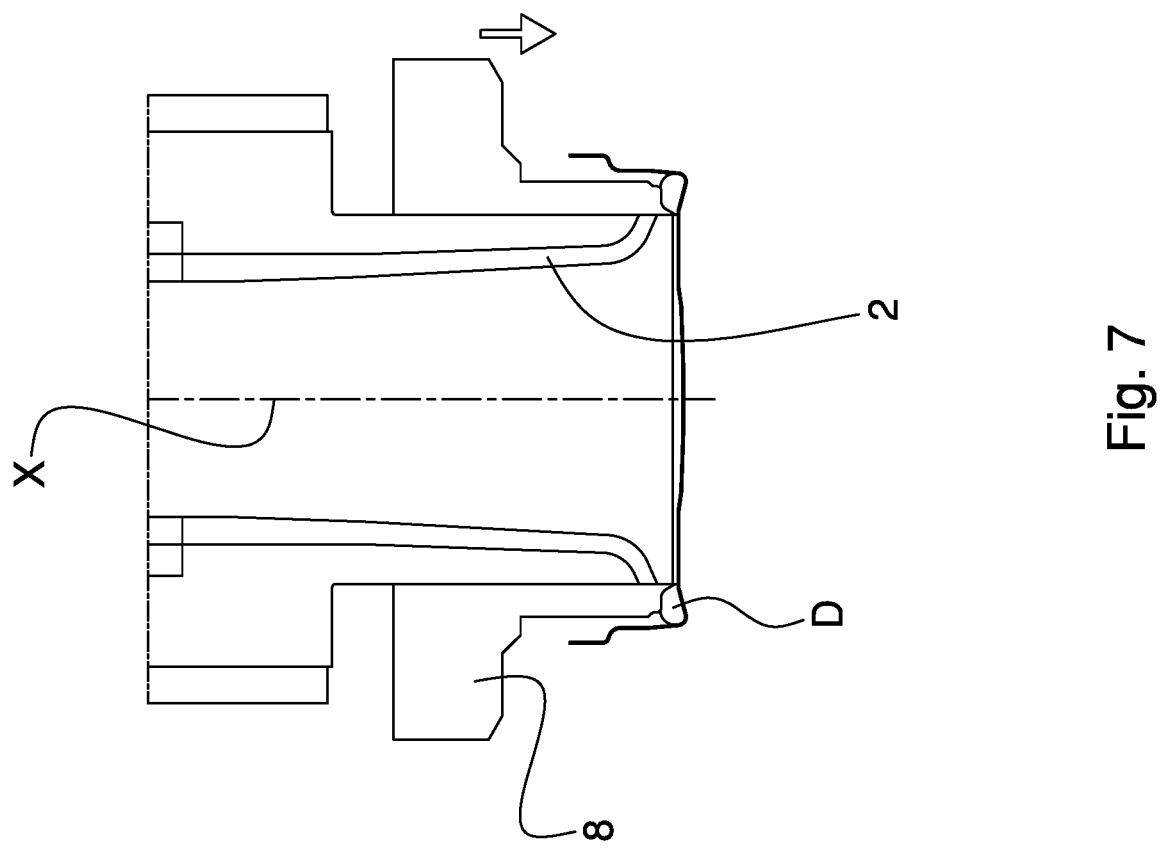

Subsequently, the surface S is brought near the annular outlet 3, while the material will continue to exit as shown in FIG. 4. When a desired quantity of material has exited, the cutting element 8 starts to cut the material as shown in FIG. 5, by performing a downward cutting movement. By continuing the cutting movement, the annular dose D is separated from the rest of the material as shown in FIG. 6. The cutting element 8 continues the downward movement, pushing the annular dose D until the annular dose D is deposited on the surface S of the capsule as shown in FIG. 7. At this point the cutting element 8 and the surface S are moved away from one another, in such a manner that the annular dose D remains adhering to the surface S, which has greater adhesive capacity than the cutting element 8 as shown in FIG. 8. This moving away may be performed, as in this case, by a downward movement of the surface S, in particular by a movement of the supporting assembly that carries the capsule. The cutting element 8 may at the same time return to the cycle start position or pre-cutting position in which a new cutting cycle of a new annular dose can start.

As is seen, in a dose cutting step the annular outlet 3 is closed in such a manner that the annular portion of material that has exited from the nozzle is separated from the rest of the plasticised material, which remains inside the annular outlet 3.

The coupling between the annular wall 6 and the cutting element 8 (slidable axially with respect to the wall 6) is such that leaking of the plasticised material (melted plastics) upwards due to the pressure inside the conduit is prevented. This coupling may be, for example, cylindrical or prismatic.

Reciprocal (axial) movement cycles of the cutting element 8 may be performed (in combination with the corresponding movements of the surface S) so as to form at each cycle at least one annular dose D. Each dose forming cycle may be performed, in particular, at each revolution of the carousel.

The annular dose D that has exited the annular channel is separated from the rest of the material remaining inside the annular outlet through the effect of the cutting of the plasticised material by the cutting edge of the cutting element.

As is seen, the annular dose D that has exited the annular channel is deposited on a surface S of a capsule for containers, adhering to the aforesaid surface S. This surface S of capsules is then removed, so that the annular dose D is separated from the cutting element (in particular from the cutting edge and from the thrust portion) by virtue of the fact that the dose adheres more to the surface S of capsules than to the surfaces of the cutting element.

As is seen, the annular dose D is then compression-moulded directly on the surface S (of a capsule) on which it had been previously deposited, in particular to form a gasket of the capsule.

The forming machine will be provided with a device (not illustrated) for supplying the capsules to be processed to the carousel and for evacuating the processed capsules from the carousel.

It is possible that the continuous flow of plasticised material through the extruder main conduit upstream of the annular channel is constant. It is also possible that also the frequency of the motion cycles of the cutting element is constant.

The plasticised material may traverse the annular outlet at a temperature below 250° C., in particular below 220° C. (and furthermore, for example, above 150° C.). The average movement speed of the cutting element 8 in front of the annular outlet may be, in particular, below 1 m/sec (for example comprised between 0.1 and 1 m/sec, or between 0.5 m/sec and 1 m/sec).

The plasticised material may be selected, for example, from a group of materials that includes: polyethylene copolymers, such as, for example, LLDPE, LDPE, metocene; styrene block copolymers, for example with two or three blocks, or ramified, for example S-B-S, S-I-S, S-EB-S; mixtures of polypropylene, for example EDPM, EDR; dynamic vulcanised polypropylene products and EPDM; dynamic vulcanised polypropylene products and butyl rubber, dynamic vulcanised polypropylene products and natural rubber; dynamic vulcanised polypropylene products and nitrile rubber.

The average exiting speed of the plasticised material from the annular outlet 3 may be, for example, comprised between 5 and 100 mm/sec.

It is observed that the cutting element 8 disclosed above defines a cutting ring, having an annular cutting edge that is relatively thin to permit clean and precise cutting of the material arranged at the annular outlet.

It is possible to obtain the same weights of the annular doses D separated in the various opening and closing cycles, for example by a constant overall flowrate of the plasticised material conveyed by the extruder and a constant cutting frequency (frequency of the motion cycles of the cutting element). The constant flowrate of the plasticised material may be obtained via the control of the extruding screw at a constant rotation speed and/or by using a flowrate stabilising device of known type.

It is further noted that that it is possible to work at relatively low temperatures of the plasticised material, as the cutting action of the annular dose performed by the cutting element 8 is more effective and precise at low material temperatures (and high viscosity).

The supply path of the plasticised material may comprise, for example, a first path part (part that is fixed and outside the carousel) wherein the material is carried in plasticised form to the carousel via the main conduit (not shown). In a second path (part that rotates and is inside the carousel) the material is taken to the various forming apparatuses via a plurality of secondary conduits that branch off from the main conduit. Each secondary conduit enters the forming apparatus 1 and then terminates with the annular channel 2 from which the annular dose D exits. The fixed and the rotating part of the path of the plasticized material in the extruder may be connected together via a connecting device (not shown), for example a rotating distributor.

Figure 9:
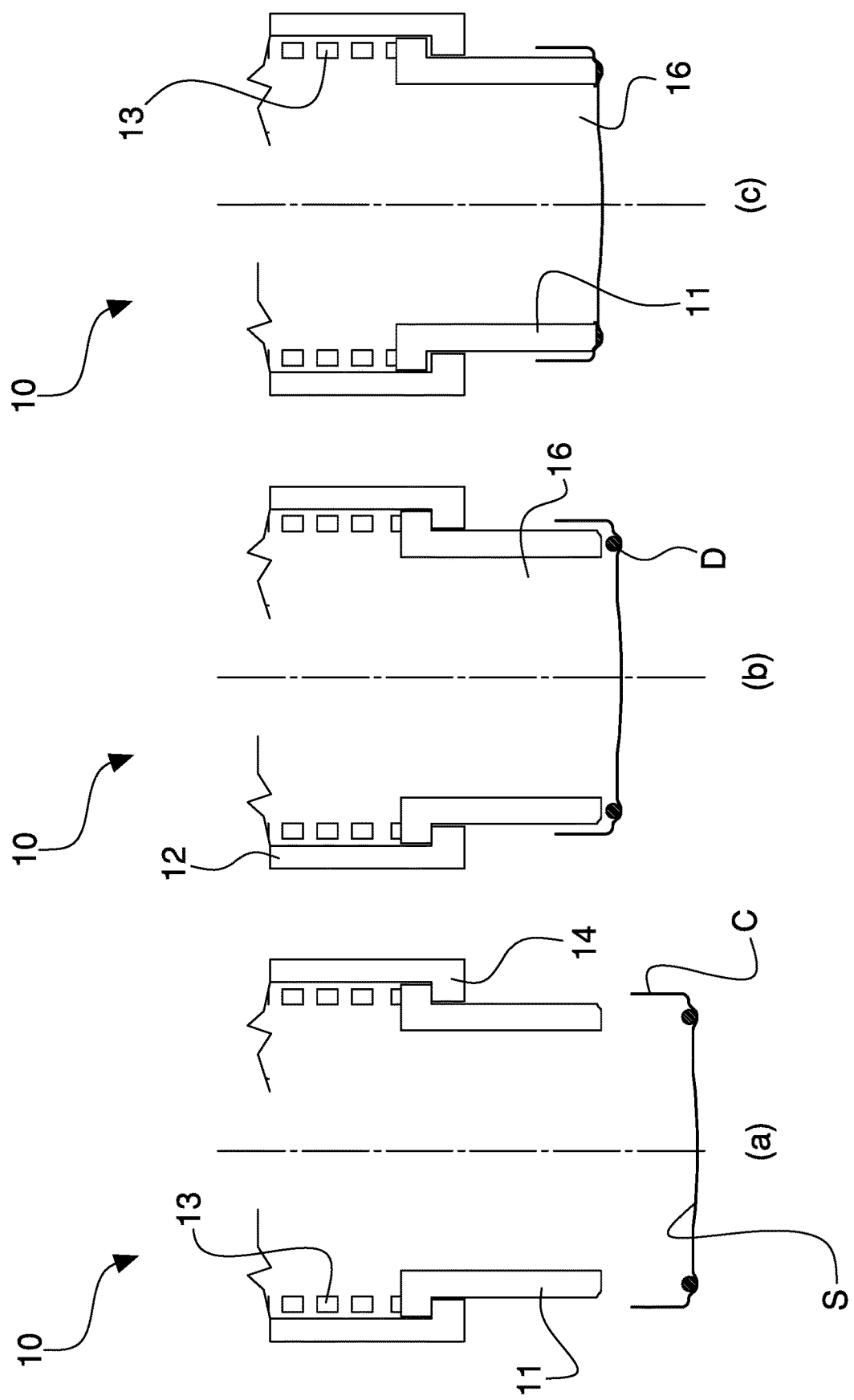
FIG. 9 shows three consecutive operating steps (a), (b), (c) of the compression forming means for moulding the annular dose.
Figure 10:
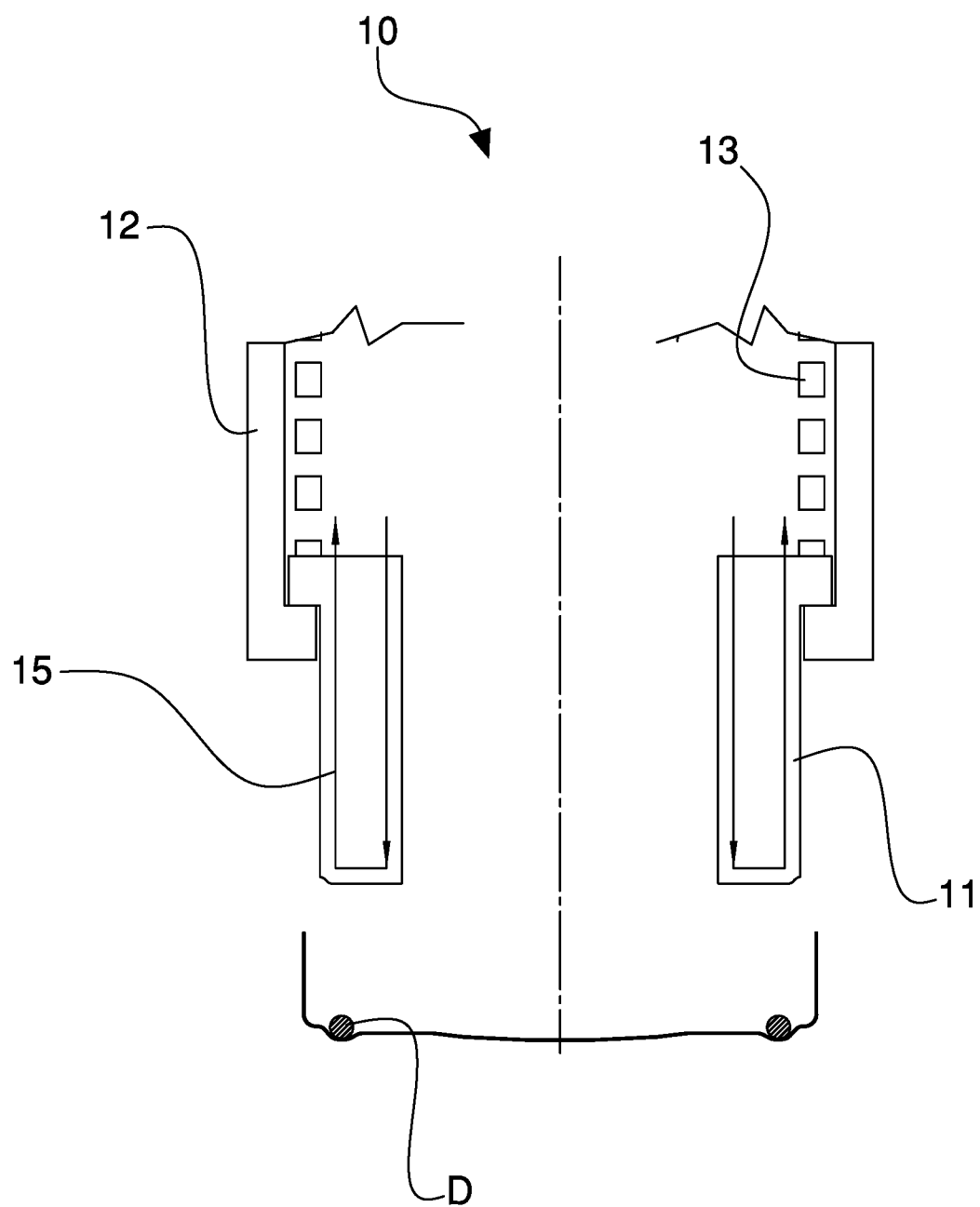
FIG. 10 shows an alternative embodiment of a compression forming device including a thermal conditioning circuit.

With reference to FIGS. 9 and 10, two embodiments are shown of the compression forming assembly indicated overall with 10 for forming the annular dose D after it has been deposited on the surface S. The compression forming assembly 10 may include, as in these two examples, an annular punch 11 and at least one support 12 that carries the annular punch 11. The annular punch 11 may be slidably fitted in an axial direction on the support 12. The compression forming assembly may include an elastic device 13 operating on the annular punch 11. The elastic device 13 maintains the annular punch 11 in an abutting position against an abutting element 14. The abutting element 14 may include an annular shoulder that protrudes from the support 12. In the embodiment in FIG. 10, the annular punch 11 includes a thermal conditioning or cooling circuit 15. It is possible to arrange a thermal conditioning system including a temperature sensor and a thermal actuator for controlling the temperature of the annular punch 11.

FIG. 9 illustrates the operation of the compression forming assembly, from a step (a) wherein the dose D has already been deposited on the surface S of the object (capsule C) and the object has been transferred to the compression zone. In the following step (b), the object and the annular punch 11 are mutually approached by moving the object upwards. In step (c), the annular punch 11 compresses the dose D to form the gasket.

In the embodiments of FIGS. 9 and 10, the annular punch 11 includes an internally empty space 16 (of cylindrical shape, as in these embodiments, or of annular shape, or of still another shape) of sufficient width (for example at least 0.5 mm) to enable the plastics of the dose D to overflow. In particular, no central element is arranged that is suitable for laterally containing the plastics of the dose D that is subject to mechanical compression. The plastics can overflow internally, not being contained on the internal side. It has in fact been seen that there are some advantages in arranging a free space 16 inside the cavity of the annular punch 11, in particular a space that is not occupied (at least entirely) by an internal element (central punch) that laterally bounds a dose D forming cavity and that could come into contact with the material of the dose D.

Firstly, the material of the dose D cannot adhere to any element of the compression forming assembly arranged inside the annular punch 11 to laterally contain the material. This internal element, i.e., the central punch is either absent, as in the illustrated examples, or is arranged spaced away from the annular punch 11, to give rise to the space 16, without coming into contact with possible material overflowing laterally to the interior. As the material of the dose D does not adhere to the internal lateral containing element, the formation of possible burrs, generated in particular during the step of extracting the object, is reduced. The possible detachment from the object or capsule of the moulded element or gasket is also prevented especially during the step of extraction of the object if the adhesion to the central punch is particularly strong.

Having an internal containing element (central punch) is also avoided that is in contact with an internal surface of the object (capsule), in general coated with a protective layer (for example a layer of preheated varnish to facilitate the adhesion of the gasket), which layer could be damaged (pierced) by the edge of the internal element (central punch), with consequent damage to the protective layer so that, for example, the metal material (no longer covered by the protective layer) of a container closing cap could come into contact with and contaminate the contents of the container closed by the capsule. The absence of such a lateral containing element prevents damage to the protective layer and consequent contamination of the contents.

Further, the absence of a central punch is advantageous because, if the deposited dose D is not perfect and thus, overflowing internally, is touched (pinched) by a possible central punch, burrs would be produced that would contaminate the final product by remaining therein. The central element could further represent, if present, an obstacle to the evacuation of the air from the gasket (with the possible formation of bubbles, burrs, etc). it is further noted that the absence of a central (punch) element entails a cost reduction of the apparatus.

The central element would also complicate the thermal management of the system. The absence of the central element enables an annular punch 11 with a greater width as shown in FIG. 10 to be made, which facilitates the arrangement of the thermal conditioning or cooling circuit 15 inside the annular punch 11. This arrangement is particularly effective and enables optimum cooling to be obtained, with consequent improvement of the quality of the final product, i.e., a gasket.

The invention claimed is:

1. A method comprising the steps of:
   supplying a flow of plasticised material through an annular channel that is defined between at least one internal core and at least one external annular wall that at least partially surrounds said core, said annular channel terminating with an annular outlet;
   pressurizing the plasticised material upstream of said annular channel to cause said plasticized material to exit said annular outlet; and
   separating an annular dose from said plasticized material by moving a cutting element with respect to said annular wall and to said core so that said cutting element passes in front of said annular outlet;
   wherein the separating step comprises the steps of:
   depositing said annular dose, which is still in contact with said cutting element, on a surface of an element for containers having an adhesion capacity greater than that of said cutting element to adhesively apply said annular dose to said element for containers, said surface being a portion of a final product; and
   reciprocally distancing said surface relative to said cutting element such that said annular dose is detached from said cutting element while remaining adhered to said surface.

2. The method according to claim 1, wherein said element for containers comprises a closure for containers.

3. The method according to claim 2, wherein said annular dose is compression-moulded to form a gasket of said closure for containers.

4. The method according to claim 1, wherein said surface is preventively activated by at least one of heating and applying a layer of primer.

5. The method according to claim 1, wherein said plasticised material exits said annular outlet at a temperature between 150° C. and 250° C.

6. The method according to claim 1, wherein the speed of said cutting element while it passes in front of said annular outlet is below 1 m/sec.

7. The method according to claim 6, wherein the speed of said cutting element while it passes in front of said annular outlet is above 0.1 m/sec.

8. The method according to claim 1, wherein said cutting element comprises an annular body that moves in a direction that is parallel to a longitudinal axis of said annular channel and slides axially outside said annular wall.

9. The method according to claim 1, wherein said plasticised material is selected from a group of materials that includes polyethylene copolymers, styrene block copolymers, mixtures of polypropylene, dynamic vulcanised polypropylene products and EPDM, dynamic vulcanised polypropylene products and butyl rubber, dynamic vulcanised polypropylene products and natural rubber, and dynamic vulcanised polypropylene products and nitrile rubber.

10. The method according to claim 1, wherein said plasticised material exiting said annular outlet is supplied under pressure in a continuous flow of plasticised material through an extruder main conduit arranged upstream of said annular channel.

11. The method according to claim 1, wherein said annular channel extends along a longitudinal axis and wherein said plasticised material has an exit direction throughout said annular conduit with at least one radial component that is normal to said longitudinal axis.

\* \* \* \* \*